US008656433B2

(12) United States Patent
Wang (10) Patent No.: US 8,656,433 B2
(45) Date of Patent: Feb. 18, 2014

(54) TV PROGRAM INFORMATION MANAGEMENT METHOD AND A REMOTE CONTROL

(76) Inventor: Chien-Fa Wang, Sindian (TW)

(*) Notice: Subject to any disclaimer, the term of this patent is extended or adjusted under 35 U.S.C. 154(b) by 988 days.

(21) Appl. No.: 12/472,171

(22) Filed: May 26, 2009

(65) Prior Publication Data

US 2010/0257564 A1    Oct. 7, 2010

(30) Foreign Application Priority Data

Apr. 2, 2009   (TW) .............................. 98110967 A (51) Int. Cl.
*H04N 5/445* (2011.01)
(52) U.S. Cl.
USPC .............................. 725/50; 348/734; 709/219
(58) Field of Classification Search
USPC ................ 725/37–61; 709/217–232; 348/734
See application file for complete search history.

(56) References Cited

U.S. PATENT DOCUMENTS

| | | | |
|---|---|---|---|
| 6,865,746 B1 * | 3/2005 | Herrington et al. ............. | 725/53 |
| 7,210,159 B2 * | 4/2007 | Roop et al. ....................... | 725/54 |
| 7,821,419 B2 * | 10/2010 | Hayes et al. ................ | 340/12.28 |
| 8,111,335 B1 * | 2/2012 | Naidas ........................... | 348/734 |
| 8,341,669 B2 * | 12/2012 | Lau et al. ......................... | 725/39 |
| 8,358,383 B2 * | 1/2013 | Wills ............................. | 348/734 |

FOREIGN PATENT DOCUMENTS

| | | |
|---|---|---|
| CN | 2456380 Y | 10/2001 |
| CN | 1719483 A | 1/2006 |
| EP | 1615429 A2 | 1/2006 |
| JP | 09-322147 | 12/1997 |
| JP | 2005-295272 | 10/2005 |

OTHER PUBLICATIONS

First Japanese Office Action for Japanese Patent Application No. 2009-146071.
English Language Translation of First Japanese Office Action for Japanese Patent Application No. 2009-146071.
Second Japanese Office Action for Japanese Patent Application No. 2009-146071.
English Language Abstract of JP 09-322147.
English Language Abstract of JP 2005-295272.
Korean Office Action for Korean Patent No. 10-1064448.
English Language Translation of Korean Office Action for Korean Patent No. 10-1064448.
Chinese Office Action for Chinese Patent Application No. 200910068563.3.
English Language Abstract of CN 2456380Y.
English Language Abstract of CN 1719483A.

* cited by examiner

*Primary Examiner* — Annan Shang
(74) *Attorney, Agent, or Firm* — Abe Hershkovitz; Hershkovitz & Associates, PLLC (57) ABSTRACT

A TV program information management method has steps of creating a channel information table, receiving and updating channel program information, generating arranged channel information and receiving download request. A management platform generates an arranged channel information according to the channel information table and the updating channel program information. The arranged channel information is hierarchical information related to cable providers, grouped channels by similarity that are provided by the cable providers, programs of the channels and ratings of the programs. A remote control downloads the arranged channel information therein so a desired program may be selected easily.

6 Claims, 8 Drawing Sheets

| CHANNELS TABLE | | | |
|---|---|---|---|
| SN | CHANNEL NAME | SN | CHANNEL NAME |
| 0 | CNN | 8 | ANIMAL |
| 1 | ABC | 9 | DISNEY |
| 2 | TVGN | 10 | ESPN |
| 3 | LIFE | 11 | ESPN2 |
| 4 | NBC | 12 | HBO |
| 5 | PBS | 13 | HBO2 |
| 6 | ION | 14 | DISCOVERY |
| 7 | BBC | 15 | MTV |
| ... | | ... | |

FIG.5

| CABLE PROVIDER LIST | | | |
|---|---|---|---|
| CODE | U.S.E. CABLE PROVIDERS | CODE | U.S.E. CABLE PROVIDERS |
| 11 | ADELPHIA COMMUNICATION | 31 | COMCAST |
| 12 | BRIGHT HOUSE METWORKS | 32 | MEDIACOM COMMUNICATIONS |
| 21 | CABLEVISION | 41 | COX COMMUNICATIONS |
| 22 | CHARTER COMMUNICATIONS | 42 | TIME WARNER CABLE |

FIG.6

| CHANNEL NUMBER INFORMATION TABLE |||| 
|---|---|---|---|
| PROVIDER NAME | CABLEVISION | COMCAST | COX COMMUNNICATIONS |
| PROVIDER CODE | 21 | 31 | 41 |
| CHANNEL NAME | CHANNEL NO. | CHANNEL NO. | CHANNEL NO. |
| 0-CNN | 57 | 57 | 57 |
| 1-ABC | 58 | 58 | 58 |
| 2-TVGN | 82 | 82 | 82 |
| 3-LIFE | 81 | 81 | 81 |
| 4-NBC |  | 13 | 13 |
| 5-PBS | 12 | 12 | 12 |
| 6-ION | 85 | 85 | 85 |
| 7-BBC | 56 |  | 56 |
| 8-ANIMAL | 46 | 46 |  |
| 9-DISNEY | 15 | 15 | 15 |
| 10-ESPN | 78 | 78 | 78 |
| 11-ESPN2 | 79 | 79 | 79 |
| 12-HBO | 33 | 33 | 33 |
| 13-HBO2 | 37 | 37 | 37 |
| 14-DISCOVERY | 45 | 45 | 45 |
| 15-MTV | 39 | 39 | 39 |

FIG.7

| CHANNEL SUMMARY TABLE | | | |
|---|---|---|---|
| MOVIE | KNOWLEDGE | NEWS | SPORT |
| 33-HBO | 12-PBS | 57-CNN | 78-ESPN |
| 37-HBO2 | 46-ANIMAL | 58-ABC | 79-ESPN2 |
|  | 45-DISCOVERY | 82-TVGN |  |
|  |  | 56-BBC |  |
|  |  |  |  |
|  |  |  |  |
| MUSIC | LIFE | CARTOON |  |
| 39-MTV | 81-LIFE | 15-DISNEY |  |
|  |  |  |  |
|  |  |  |  |

FIG.8

TV PROGRAM INFORMATION MANAGEMENT METHOD AND A REMOTE CONTROL

BACKGROUND OF THE INVENTION

1. Field of Invention

The present invention relates to a TV program information management method, the method provides program information to a remote control to aid program and channel selection.

2. Description of the Related Art

Cable TV is very popular and provides multiple channels. Normally, Cable TV providers offer hundred of channels, and channels can be selected to watch programs. However, since the channels are too numerous using channel number buttons on a remote control to find a preferred program is inconvenient. Thus, remote controls are used to scan through channel to find the preferred program.

The present invention provides a TV program information management method and a remote control to obviate or mitigate the shortcomings of the conventional way to change channels.

SUMMARY OF THE INVENTION

The primary objective of the present invention is to provide a TV program information management method and a remote control, the method provides channel information to the remote control to aid program and channel selection.

The TV program information management method comprises steps of creating a channel information table, receiving and updating channel program information, generating arranged channel information and receiving download request. A management platform generates arranged channel information according to the channel information table and the updating channel program information, where the arranged channel information is hierarchical information related to cable providers, channels are grouped as provided by the cable providers by similarity, programs and ratings of the programs. A remote control downloads the arranged channel information to aid program and channel selection.

Other objectives, advantages and novel features of the invention will become more apparent from the following detailed description when taken in conjunction with the accompanying drawings.

DETAILED DESCRIPTION OF THE INVENTION

Figure 1:
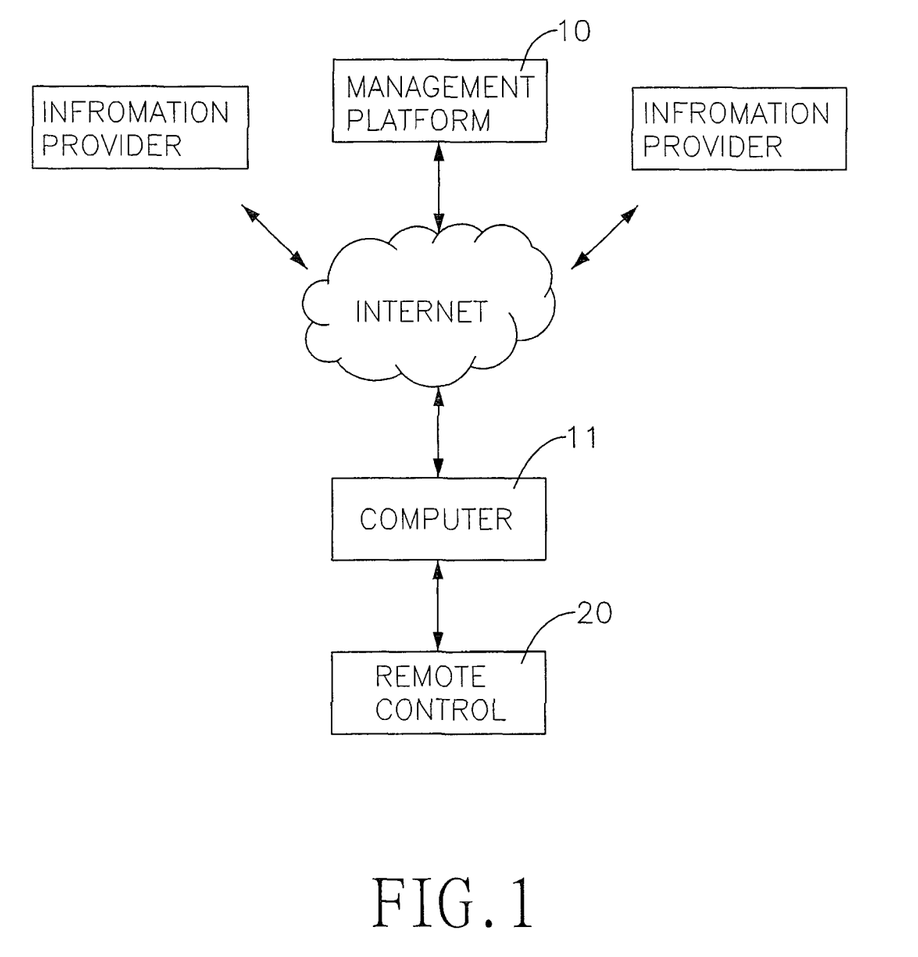
FIG. 1 is a system block diagram of a TV program information management method in accordance with the present invention.

With reference to FIG. 1, a TV program information management method in accordance with the present invention is performed on a management platform (10) and a remote control (20). The remote control (20) is connected to, downloads from and uploads data to a computer (11) via a communication interface of the computer (11). The communication interface may be a wireless interface or a USB interface. The management platform (10) collects TV programs and TV channel information from information providers via a network such as the Internet. The information provider may be a cable provider, listings provider or a combination thereof.

With reference to FIGS. 2 and 5 to 8, the TV program information management method comprises steps of: creating a channel information table (201), receiving and updating channel program information (202), generating arranged channel information (203), and receiving an upload and a download request (204).

Figure 5:
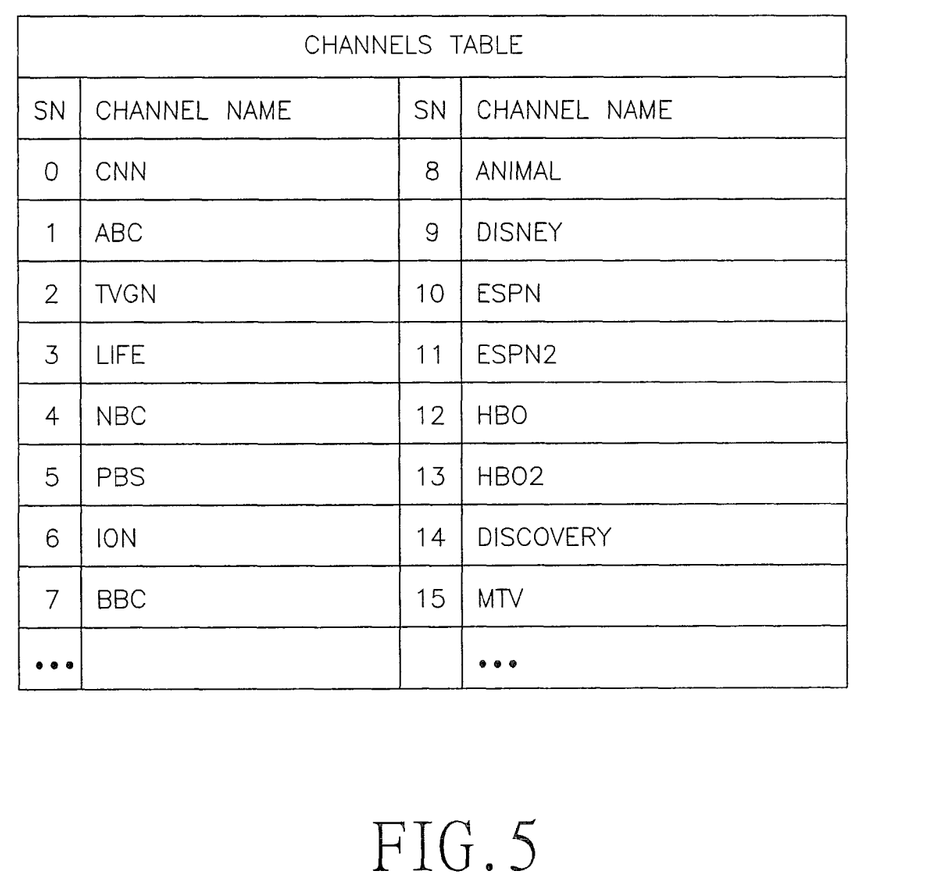
FIG. 5 is an example of a channel table of the TV program information management method in FIG. 1.
Figure 6:
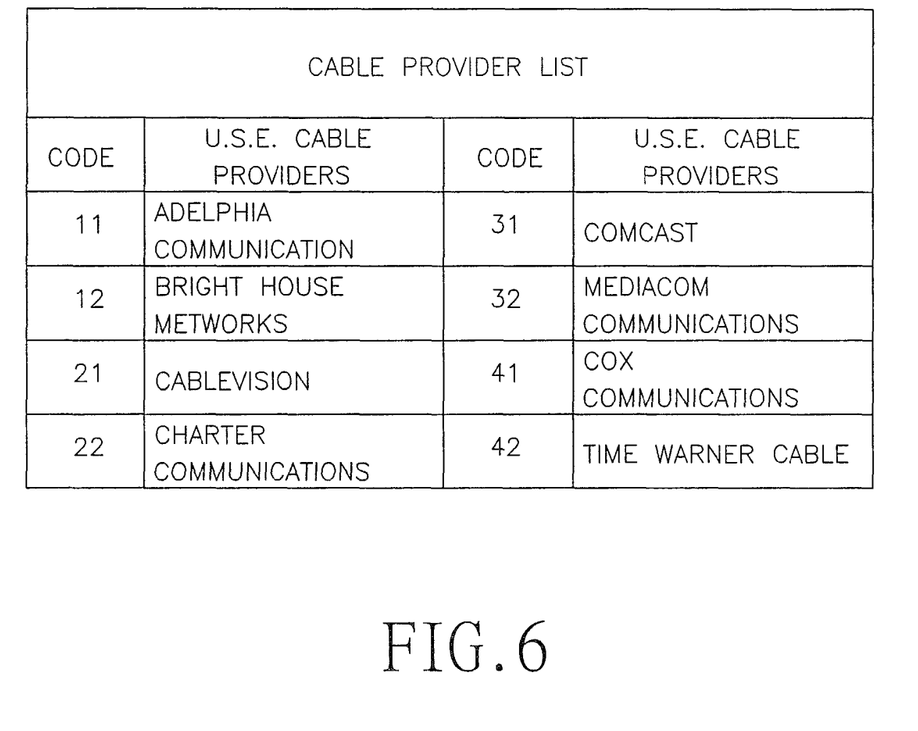
FIG. 6 is an example of a cable provider list of the TV program information management method in FIG. 1.
Figure 7:
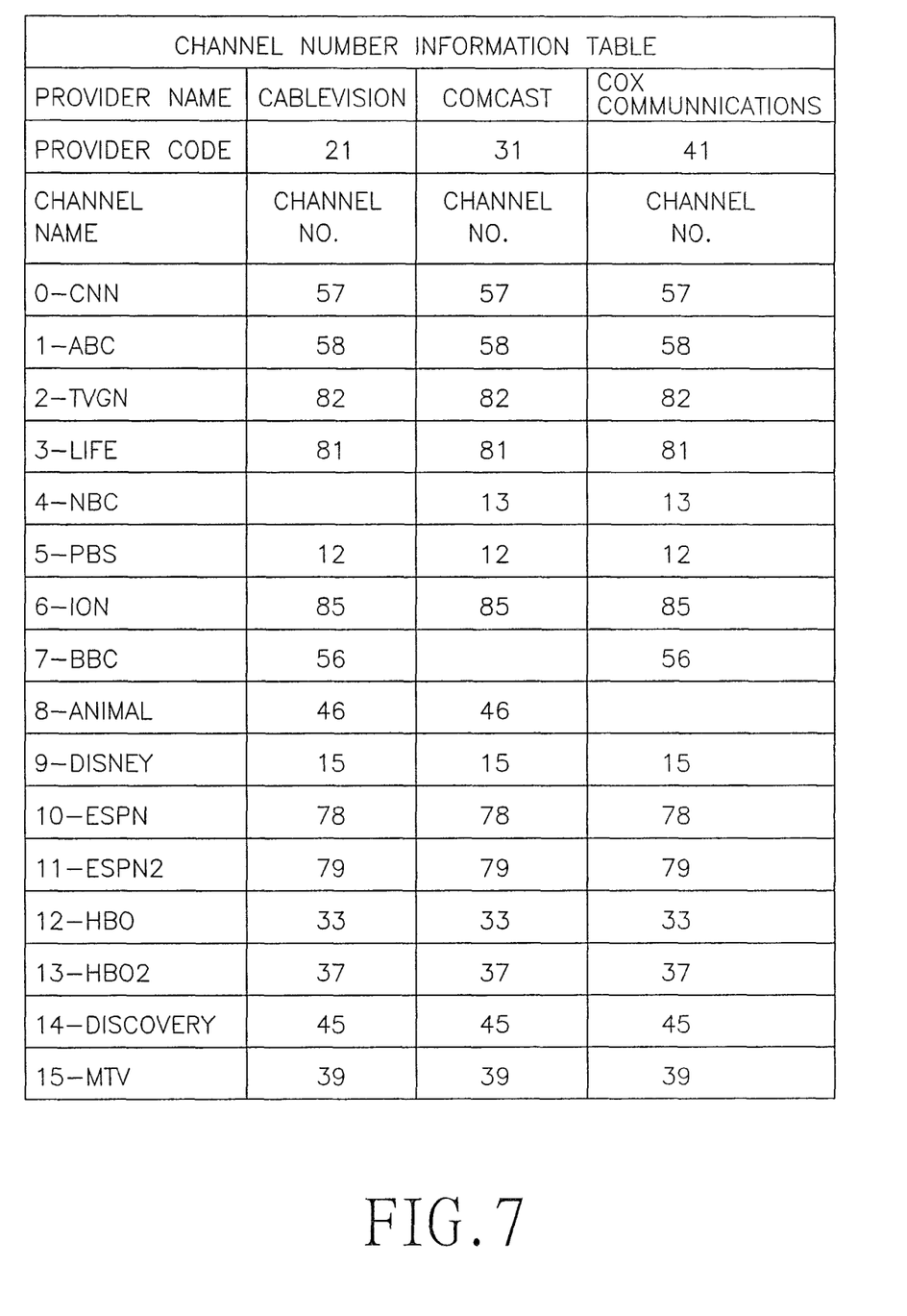
FIG. 7 is an example of a channel number information table of the TV program information management method in FIG. 1.

Creating a channel information table (201): the management platform (10) creates a channel information reference table, the channel information table comprises a channel table, a channel provider list and a channel number information table. FIG. 5 is an example of the channel table in USA, the channel table is a list of channels of Cable TV. FIG. 6 is an example of the cable provider list in USA, the cable provider list comprises names of the cable providers and a corresponding code for each cable provider. FIG. 7 is an example of the channel number information table, where the channel number information table has the cable providers, the channels of each cable providers and a corresponding channel number of each channel. Normally, cable providers set a channel number to a specific channel; however, some cable providers may have different channel numbers to other cable providers. For instance, "ESPN" is respectively listed as channel 78, 78 and 79 in Cablevision, Comcast and Cox Communications as shown in FIG. 7.

Figure 2:
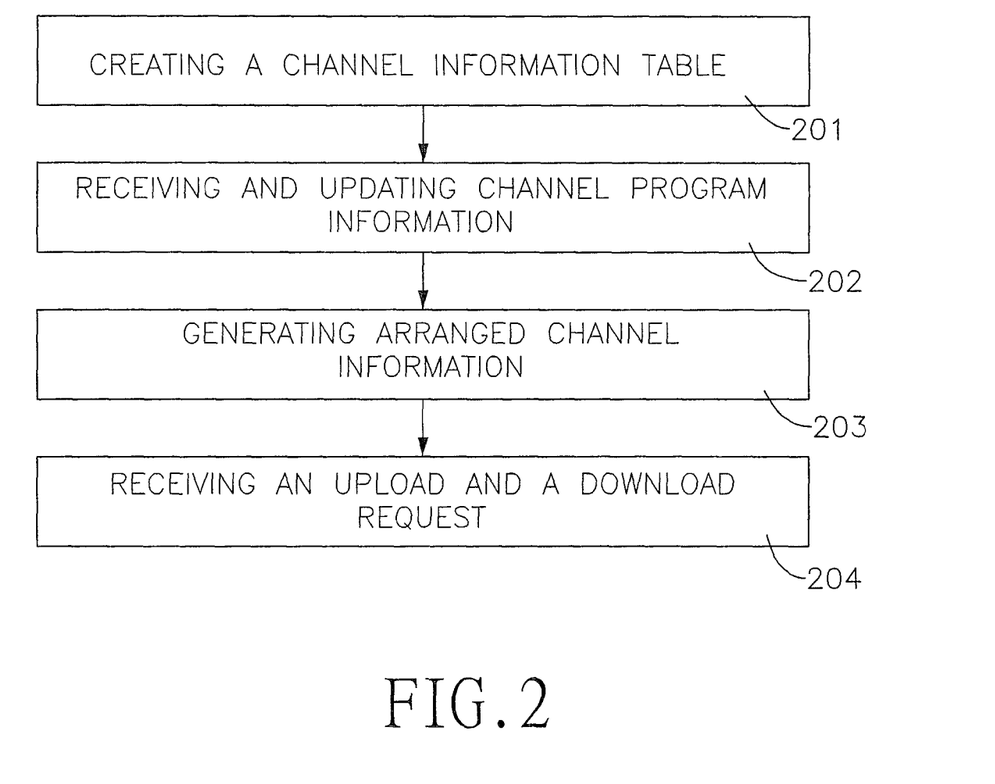
FIG. 2 is a block diagram of the TV program information management method in accordance with the present invention.

Receiving and updating channel program information (202): the management platform (10) receives a channel program information from the information providers via a network such as the internet, where the channel program information comprises a program list in a specific period of each channel. Thus, the information provider may be a database of the cable providers.

Figure 8:
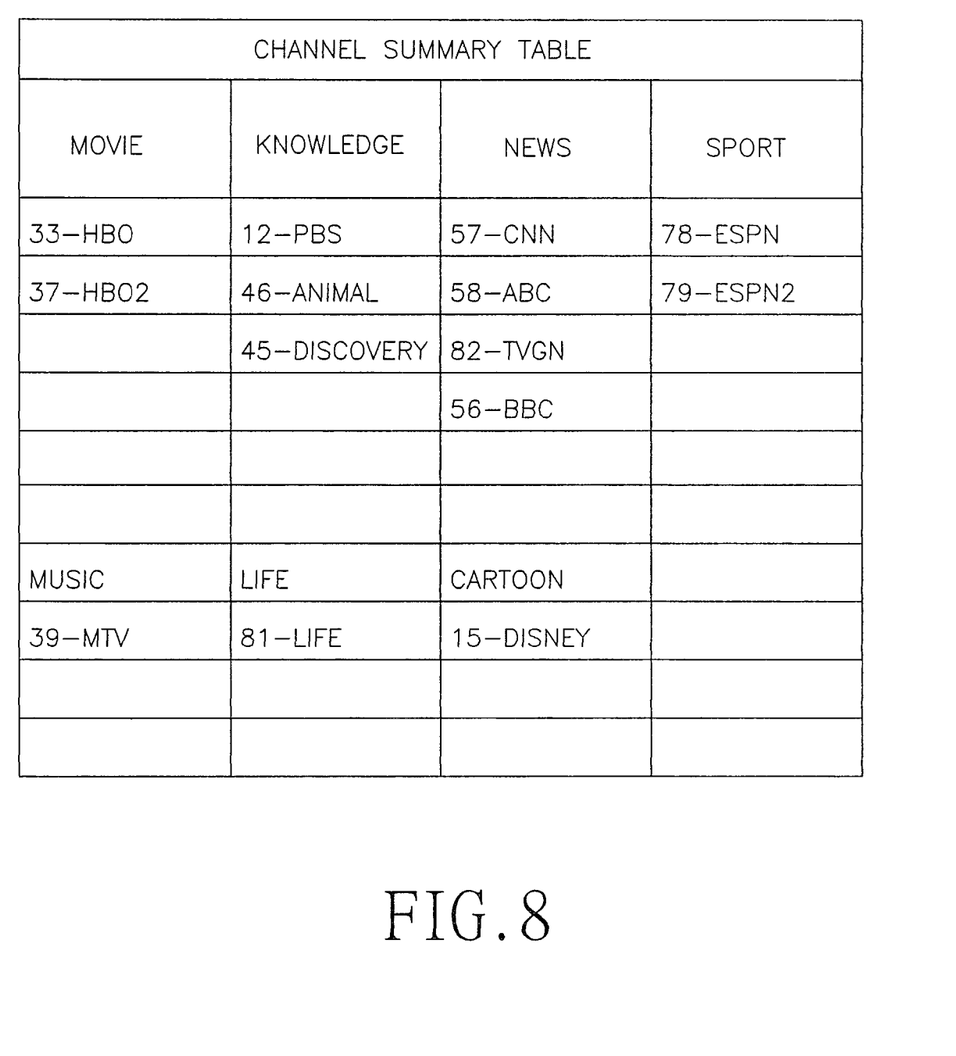
FIG. 8 is an example of a channel summary table for the TV program information management method in FIG. 1.

Generating arranged channel information (203): the management platform (10) generates an arranged channel information, where the arranged channel information comprises a channel data list and a channel summary table. The channel data list is referred from the channel program information and the channel information reference table. The channel data list comprises multiple channel items. Each channel item has multiple programs, where each program has program information. The program information has a rating setting, the rating setting may be restricted, general or the like. The channel summary table is a grouped result of the channels in the channel table and may comprise multiple groups, such as grouped by genre like "Movie", "Knowledge", "News", "Sport", "Music", "Life", "Cartoon" and etc. The management platform (10) groups the channels into different groups based on similarity of the channels.

Receiving an upload and a download request (204): The management platform (10) awaits a download request from the computer (11) for the remote control to transmit the arranged channel information and may wait for an upload request from the computer (11). When the management platform (10) has received and confirmed the upload request, the computer (11) may send data, for example, user comments to the management platform (10).

Figure 3:
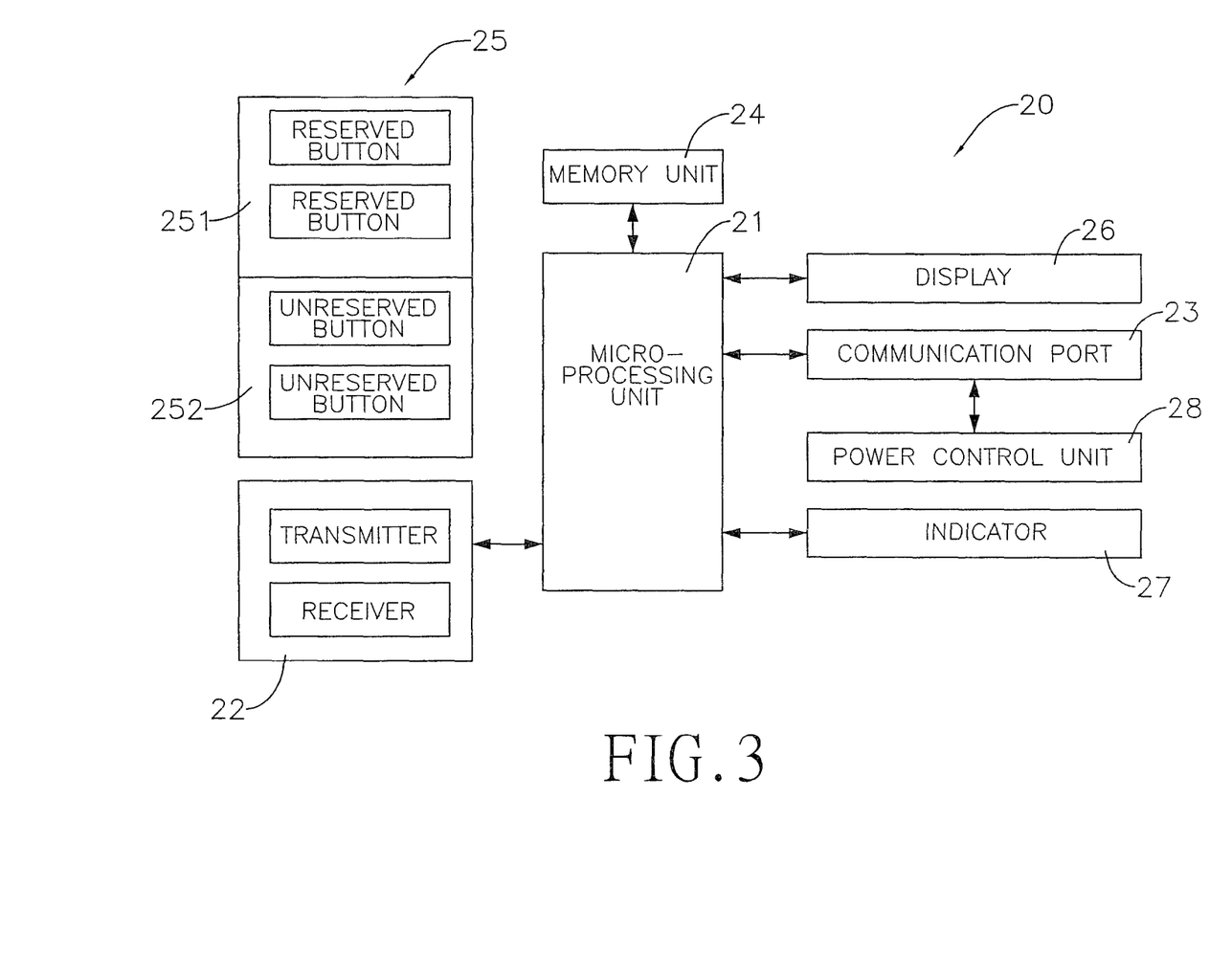
FIG. 3 is a block diagram of a remote control in accordance with the present invention.
Figure 4:
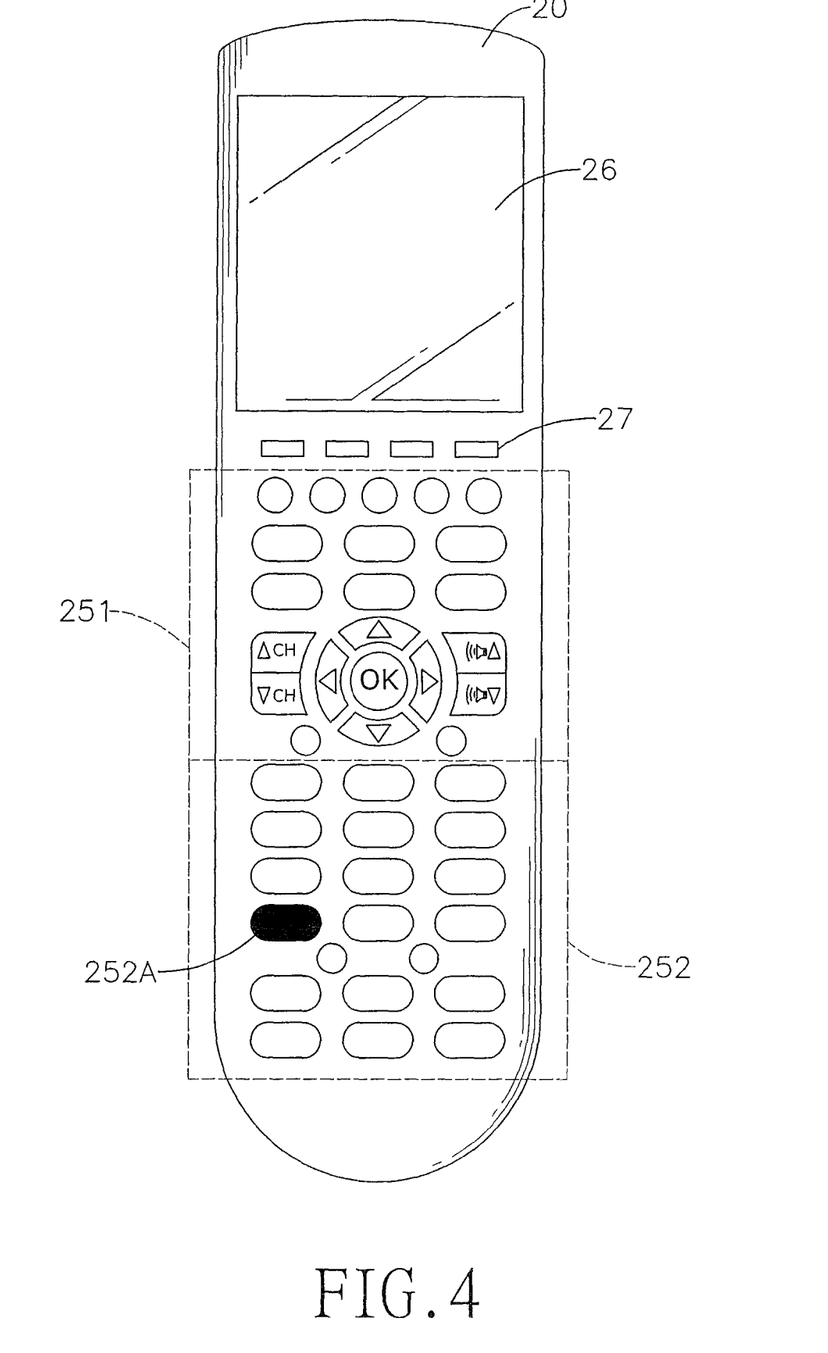
FIG. 4 is a top view of the remote control in accordance with the present invention.

With reference to FIGS. 3 and 4, the remote control (20) has a micro-processing unit (21), a transceiver (22), a communication port (23), a memory unit (24), a button assembly (25), a display (26), an indicator (27) and a power control unit (28).

The transceiver (22) is electronically connected to the micro-processing unit (21), transmits a control signal to a television wirelessly and may have a transmitter and a receiver. The receiver may be used for receiving a command from an external apparatus for the micro-processing unit (21), where the command may be a software upgrade command or the like.

The communication port (23) is electronically connected to the micro-processing unit (21) and is connected with the computer (11) to connect the micro-processing unit (21) and the computer (11). The communication port (23) may be a USB interface or a wireless interface such as Bluetooth or the like.

The memory unit (24) is electronically connected to the micro-processing unit (21), is a writable memory and is controlled by the micro-processing unit (21) to read and update (rewrite) the arranged channel information from the computer (11) via the communication port (23).

The display (26) may be a TFTLCD, is electronically connected to the micro-processing unit (21) and is controlled by the micro-processing unit (21) to display information such as the arranged channel information.

The button assembly (25) is electronically connected to the micro-processing unit (21) and has multiple reserved buttons (251) and multiple unreserved buttons (252). The reserved buttons (251) are buttons having specific functions, such as: channel selection, volume adjustment, set up, menu, enter and the like.

The unreserved buttons (252) have a number key set and a switch key (252A). The number key set comprises ten number keys corresponding from 0 to 9, each number key may be set to correspond to one group by activating the switch key (252A).

When the switch key (252A) is pressed, each number key is set by the micro-processing unit (21) from an original number to a corresponding group or vice versa. When the number keys are presented as groups, a specific group may be selected to be shown in the display (26) by pressing the corresponding number key of the specific group. The channels grouped in the specific group are also listed in the display (26). Thus, the reserved buttons (251) may be used to select one channel and one program in the selected channel from the specific group. For instance, after the channels in the specific group are shown in the display (26), the channel selection buttons to highlight a desired channel the enter button is pressed to select the desired channel. Thus, the programs of the desired channel are shown in the display (26). A desired program may be selected similarly.

When the number keys are presented with original numbers, a channel number may be input to select a specific channel.

Many keys for presenting groups are unnecessary, instead, the remote control (20) may use the number keys to perform a group indication function as described with further switch key (252A) positions and corresponding circuit means or program means. For instance, the micro-processing unit (21) may be controlled or activated by a program that is used to switch the number keys as group indications or original number presentations alternatively when the switch key (252A) is pressed.

The indicator (27) is electronically connected to the micro-processing unit (21) and is controlled by the micro-processing unit (21) to display indication lights. The indicator (27) may be an LED set having multiple LEDs. The LEDs of the LED set respectively correspond to rating settings of the programs. When a specific program is selected in the display (26), the micro-processing unit (21) turns on one LED corresponding to the rating of the specific program rating to rate a suitability of the specific program. Further, certain ratings may be blocked or password protected and may not be selected, unless a password is entered using the unreserved buttons (252).

The power control unit (28) provides power to the remote control (20) and may be a battered or a secondary battery. The power control unit (28) in a preferred embodiment of the present invention has a charging circuit and a secondary battery. The charging circuit is electronically connected to the communication port (23). The secondary battery is electronically attached to the charging circuit and is charged by the charging circuit when the communication port (23) is connected to the computer (11).

Therefore, the remote control (20) may download the arranged channel information from the computer (11), where the arranged channel information is downloaded from the management platform (10). Hence, a desired program may be selected easily from the arranged channel information, which is hierarchical information related to the cable providers, provided channels of the cable providers and programs of the channels.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A TV program information management method comprising steps of:

providing a management platform;

creating a channel information table by the management platform, wherein the channel information table comprises a channel table, a channel provider list and a channel number table;

receiving and updating channel program information, wherein the management platform receives and updates the channel program information from multiple information providers via a network, and the channel program information comprises a program list in a specific period of each channel;

generating arranged channel information, wherein the management platform generates the arranged channel information that comprises a channel data list and a channel summary table, wherein the channel data list is generated according to the channel program information and the channel information table, and the channel data list has multiple channel items, each channel item having multiple programs; and wherein the channel summary table comprises multiple groups of the channels in the channel information table, where similar channels are grouped in a same group;

transmitting the arranged channel information to a remote control of a client when a download request generated by the client from the remote control is received by the management platform;
storing the arranged channel information in the remote control; and
displaying the arranged channel information on a display of the remote control according to the client's operation.

2. The TV program information management method as claimed in claim 1, wherein each program comprises program information having a rating setting.

3. The TV program information management method as claimed in claim 2 further comprising a step of receiving an upload request by the management platform.

4. The TV program information management method as claimed in claim 3, wherein the client data comprises client comments.

5. The TV program information management method as claimed in claim 1 further comprising a step of receiving an upload request and client data sent by the remote control through a computer, wherein the upload request and the client data are received by the management platform.

6. The TV program information management method as claimed in claim 5, wherein the client data comprises client comments.

* * * * *